(12) United States Patent    (10) Patent No.:     US 7,623,774 B2
     Rukes                   (45) Date of Patent:     Nov. 24, 2009

(54) DEVICES AND METHODS FOR DETERMINING ORIENTATION OF A CAMERA

(75) Inventor: Jason R Rukes, Gurnee, IL (US)

(73) Assignee: Motorola, Inc., Schaumburg, IL (US)

( * ) Notice: Subject to any disclaimer, the term of this patent is extended or adjusted under 35 U.S.C. 154(b) by 321 days.

(21) Appl. No.: 11/461,498

(22) Filed: Aug. 1, 2006

(65) Prior Publication Data

US 2008/0031609 A1     Feb. 7, 2008

(51) Int. Cl.
*G03B 17/00*     (2006.01)
*G03B 3/00*      (2006.01)

(52) U.S. Cl. .......................................... 396/50; 396/90
(58) Field of Classification Search .................... 396/90, 396/50, 52–55, 77
See application file for complete search history.

(56) References Cited

U.S. PATENT DOCUMENTS

| | | | | |
|---|---|---|---|---|
| 4,582,411 A | * | 4/1986 | Ohmura et al. | 396/73 |
| 6,014,524 A | * | 1/2000 | Suzuki et al. | 396/50 |
| 6,067,421 A | * | 5/2000 | Kitazawa et al. | 396/133 |
| 2005/0207743 A1 | * | 9/2005 | Uehara | 396/50 |
| 2005/0276588 A1 | | 12/2005 | Tsutsumi | |
| 2005/0276590 A1 | | 12/2005 | Ishikawa et al. | |
| 2006/0033818 A1 | * | 2/2006 | Wada et al. | 348/208.11 |
| 2006/0140603 A1 | * | 6/2006 | Kurata et al. | 396/55 |

* cited by examiner

*Primary Examiner*—Melissa J Koval
*Assistant Examiner*—Leon W Rhodes
(74) *Attorney, Agent, or Firm*—Paula N. Chavez; Sylvia Chen

(57) ABSTRACT

Described are an electronic device, a camera, and a method for determining an orientation of a camera in an electronic device. The method includes measuring a position of the lens at rest within the lens cavity (680), determining a pointing direction of the camera based on the position of the lens (684), and moving the lens to a new or adjusted starting position for an auto-focus function based on the pointing direction (688). The lens is biased to a predetermined position within the lens cavity when the camera is oriented in a predetermined pointing direction. A lens position sensor can measure a position of the lens to record a measured position. By evaluating the measured lens position, the camera orientation can be determined. The auto-focus of the camera can be started at a starting position based on the camera orientation.

9 Claims, 3 Drawing Sheets

DEVICES AND METHODS FOR DETERMINING ORIENTATION OF A CAMERA

FIELD

Disclosed are devices and methods for determining an orientation of a camera, and more particularly determining the pointing direction of a camera with respect to gravity to determine the orientation of the camera.

BACKGROUNDz

Manufacturers of hand held devices, including those of mobile communication devices, are increasingly adding functionality to their devices. For example, many mobile communication devices shipped today include cameras. As advancements are being made in a variety of fields of technology, including in image capturing devices, new and improved features are steadily being incorporated into cameras of mobile communication devices. Users may capture still images and video on their mobile communication devices and transmit those files to recipient devices.

While there is a trend toward the inclusion of more features and improvements for current features, there is also a trend toward smaller mobile communication devices. Fewer and/or smaller hardware components are therefore desirable when adding new features and making improvements to the current features in the smaller devices. Fewer hardware components may also provide a cost benefit to the manufacturer and the consumer.

An improvement in a camera device could be to improve the speed of an auto-focus function. In cameras, the auto-focus function uses its image capturing functions in many or all positions of the lens to determine the image with the best clarity. To determine the image with the best clarity, the auto-focus function begins at the same starting point each time it starts the process of capturing images.

In an image capturing device, an accelerometer typically is used to detect the motion of the device to compensate for a user's inability to hold a camera perfectly still. For motion compensation, an accelerometer only needs to detect motion in the forward-to-back directions and the side-to-side directions. A three-dimensional accelerometer may also detect orientation with respect to gravity but it would be more costly than a two-dimensional accelerometer as described above.

DESCRIPTION

Described are an electronic device, a camera, and a method for determining orientation of a camera in an electronic device. The method includes measuring a position of a lens that is under the influence of gravity within a lens cavity, determining a pointing direction of the camera based on the position of the lens, and moving the lens with an actuator to a new or adjusted starting position for an auto-focus function based on the determined pointing direction.

An electronic device having a camera has a lens within a lens cavity and an elastic element such as a spring coupled to the lens. The elastic element is configured to bias the lens to a predetermined position when the camera is oriented in a predetermined pointing direction. When the pointing direction of the camera changes, the lens can move under the influence of gravity. A lens position sensor measures a position of the lens within the lens cavity to record a measured position. An evaluator module is configured to evaluate the position of the lens to determine a starting position for the lens during an auto-focus process based on the measured position of the lens. It is understood that to determine the pointing position or the orientation of the camera, the evaluator module evaluates the position of the lens when it is under the influence of gravity rather than under the influence of an actuator.

By knowing the camera orientation, the auto-focus mechanism of the camera can be started at a new or adjusted starting position based on the camera orientation. In this way, the auto-focus mechanism can use its image capturing functions starting closer to the lens position where the image would most likely have clarity. By using the lens position to determine a camera orientation and hence a new or adjusted starting position, a faster auto-focus function may be possible.

Figure 1:
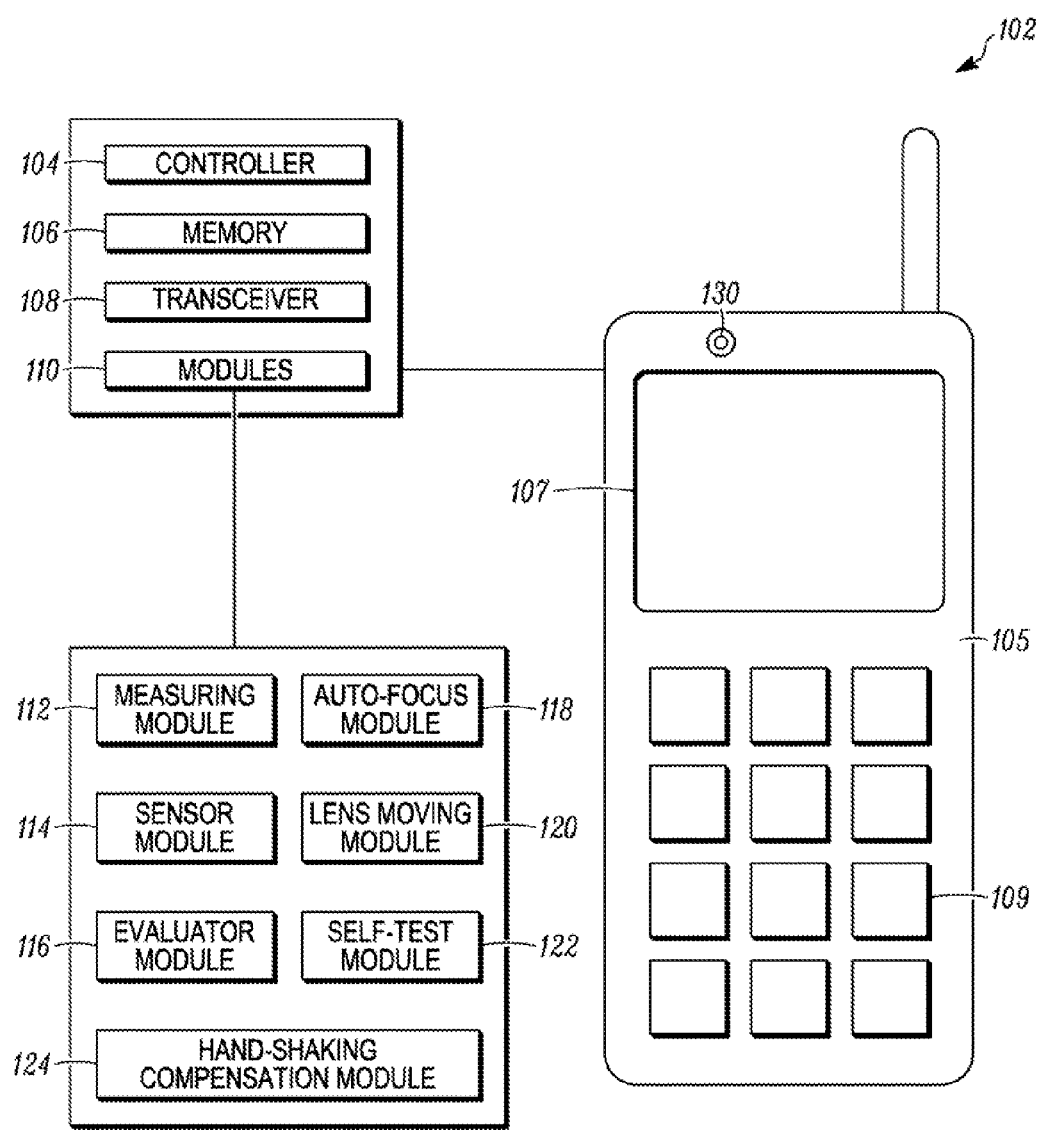
FIG. 1 shows an electronic device in accordance with an embodiment.

FIG. 1 shows an electronic device including a camera in accordance with an embodiment. In this figure, the electronic device is shown as a mobile communication device 102. A stand-alone camera, or one incorporated into any other type of electronic device is within the scope of this discussion. The mobile communication device 102 depicted in FIG. 1 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment.

The mobile communication device 102 includes components such as a controller 104, memory 106, a transceiver 108, and modules 110. The modules can include a measuring module 112, a sensor module 114, an evaluator module 116, an auto-focus module 118, a lens moving module 120, a self-test module 122, and a hand-shaking compensation module 124. The modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

The front side 105 of the device as depicted in FIG. 1 shows a camera 130, a display device 107, and a keypad 109. One or more cameras may be situated anywhere on the device 102. The keypad 109, for example, can include navigation components and camera control components including an auto-focus initiation button and a shutter release button. It is understood that the camera control functions may be in any suitable form.

Figure 2:
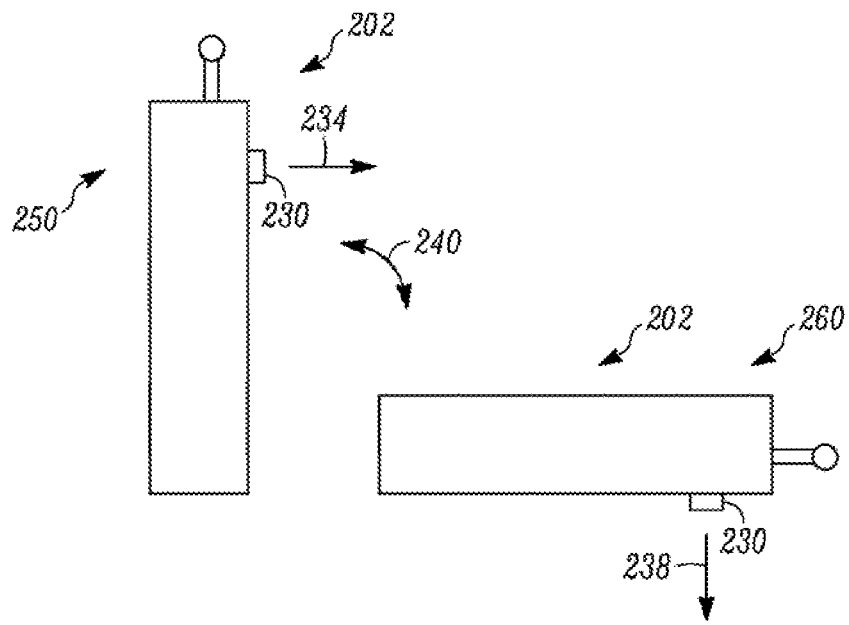
FIG. 2 depicts an electronic device in two orientations in accordance with an embodiment.

FIG. 2 depicts an electronic device 202 including a camera 230 in two orientations in accordance with an embodiment. The camera 230 is shown in a horizontal first position 250. The camera is in a horizontal position when the pointing direction 234 of the camera 230 is parallel to the ground (that is, perpendicular with respect to gravity). It is understood that the camera would also be in a horizontal position if it pointed to the left instead of the right.

FIG. 2 further depicts the electronic device 202 including a camera in a vertical second position 260 with its camera 230 having a downward pointing direction 238. The camera is in a downward vertical position when the pointing direction 238 of the camera 230 is toward the ground (that is, the same direction as gravity's pull). The arrow 240 between device positions 250 and 260 represents some other possible positions of the camera 230 with respect to gravity.

Figure 3:
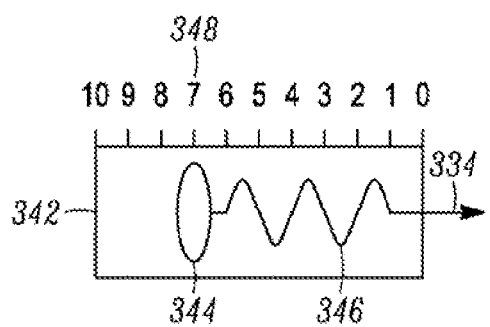
FIG. 3 illustrates a lens cavity with a lens when the camera is in a horizontal position in accordance with an embodiment.

FIG. 3 illustrates a lens cavity with a lens when the camera is in a horizontal position in accordance with an embodiment. A lens cavity 342 with a lens 344 may be in a camera in a horizontal position (250, see FIG. 2) when a user is pointing the camera in a horizontal direction to take an image typically at a distance. An elastic element 346 which may be, for example, a spring, is coupled to the lens 344 and configured to bias the lens to a predetermined position 348 when the camera is oriented in a predetermined pointing direction 334. In this example, the predetermined pointing direction 334 is horizontal. The numbers 0-10 indicated on the side of the lens cavity 342 are to illustrate relative positions of the lens in the lens cavity. When the camera is in the horizontal position, the pointing direction 334 is not substantially downward, and the lens is biased to an initial position by the elastic element 346 coupled to the lens 344. That is, when the lens 344 is at rest while the camera is oriented in the predetermined pointing direction 334, the elastic element 346 biases the position of the lens 344, for example, at position "7." It is understood that the lens 344 can include multiple lenses in a lens assembly.

Figure 4:
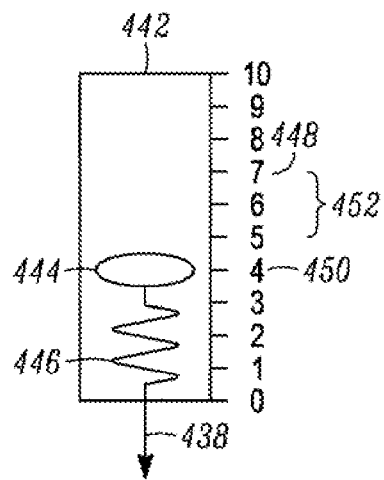
FIG. 4 illustrates a lens cavity with a lens when the camera is in a downward vertical position in accordance with an embodiment.

FIG. 4 illustrates a lens cavity 442 with a lens like that of FIG. 3; however, the camera is in a vertical position (260, see FIG. 2) and the lens 444 is in a different position than that shown in FIG. 3. When the camera is in the vertical position so that the camera is pointing downward 438, the position 450 of the lens 444 can be closer to relative position "0." That is, when the lens moves toward the "0" marker due to the pull of gravity, the elastic element 446 is in a compressed state. Detecting elastic element compression can also indicate orientation without sensing lens position, per se. It is understood that other detectors and/or sensors associated with lens movement under the influence of gravity could be used without exceeding the scope of this disclosure. In FIG. 4, the elastic element 446 is compressed and the position 450 of the lens, for example, is at relative marker "4."

Referring to FIG. 3, as mentioned above, the lens assembly includes an elastic element 346 so the lens 344 can float with a slight position bias via the elastic assembly. The lens may therefore move when no power is applied to an auto-focus actuator 562 (see FIG. 5). When a user points the camera downward toward the ground as depicted by position 260 of FIG. 2 and by lens cavity 442 of FIG. 4, the lens will move toward position "0." A user may point the camera downward as shown to capture images of close-in objects, for example, of business cards or reading material. The auto-focus mechanism can move the lens to a first starting position after it is determined that the pointing direction of the camera is substantially downward as shown in FIG. 4. On the other hand, when the pointing direction is not substantially downward as shown in FIG. 3, the auto-focus mechanism can move the lens to a second starting position.

Figure 5:
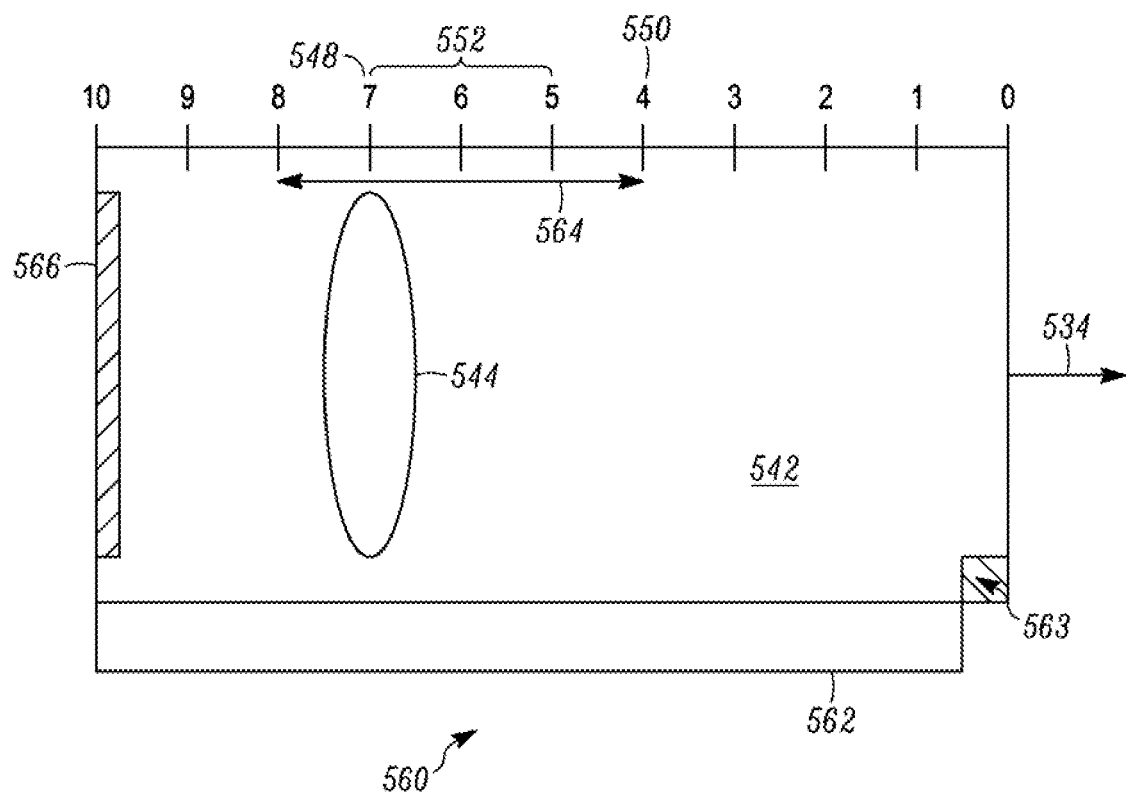
FIG. 5 shows certain components of an auto-focus assembly in accordance with an embodiment.

FIG. 5 shows certain components of an auto-focus assembly 560 in accordance with an embodiment. The assembly includes a lens position sensor 563 and an imager 566. It is understood that the lens position sensor can be a plurality of lens position sensors and may be of any type. The lens 544 can move in accordance with the actuator 562 that can be a voice coil, piezoelectric, MEMS (microelectromechanical systems), or other type of actuator. The actuator of the auto-focus assembly is used to mimic manual focus of the lens to keep an object or actor focused within the field of view. The lens 544 can be moved along the actuator in a direction of motion 564 along the lens cavity 542.

As discussed above, in general, an auto-focus mechanism uses the camera's image capturing functions in many or all positions of the lens to determine the image with the best clarity. The auto-focus mechanism generally begins at a particular starting point each time it starts the process of determining the image with the best clarity.

In the event that the camera's pointing direction were downward where the lens has a resting position "4," identified by position 550 in FIG. 5 and position 450 in FIG. 4, the user is likely to be taking a close-up picture. Thus, the image with the best clarity likely may be taken with the lens closer to the position "0" than the position "10." Therefore, when the lens position sensor 563 determines that the lens is in a position indicating a downward vertical position of the camera, then the adjusted starting position for the lens at the start of the auto-focus process may be closer to position "0."

In the event that the camera's pointing direction were not vertically downward, the lens resting position may be "7," identified by 548 in FIG. 5 and 348 in FIG. 3, and the user is not likely to be taking a close-up picture. Thus, the image with the best clarity may likely be taken with the lens closer to position "10" than position "0." Therefore, when the lens position sensor 563 determines that the lens is in a position indicating a non-downward pointing direction of the camera, then the adjusted starting position for the lens at the start of the auto-focus process may be closer to position "10."

By adjusting the starting position of the auto-focus function so that the lens is closer to a position where it is likely that an image with the best clarity will be realized, the auto-focus function may be faster than that without an adjusted starting position. While FIGS. 3 and 4 show the lens cavity in either a horizontal position or a downward vertical position, it is understood that the pointing direction 534 may be at any angle with respect to gravity. The lens position sensor 563 is configured to sense the position of the lens 544 within the lens cavity. It is understood that any type of sensor capable of measuring the position of the lens within the lens cavity can be used, including for example, a Hall Effect sensor, a capacitive sensor, a photo interrupter, or an inductive sensor.

Returning to FIGS. 3 and 4, the lens position sensor (563, see FIG. 5) may measure whether the lens 344 and 434 is at rest and therefore at a particular position within the lens cavity or within a particular interval between the positions "0"-"10". A predetermined particular position indicated by both 348 and 448 may be position "7" which can indicate a substantially horizontal or non-downward pointing direction 334. When the lens is at rest, it is not under the influence of the actuator 562 (see FIG. 5), but is under the influence of gravity. The lens position sensing can be processed by the sensor module 114 (see FIG. 1). An evaluator module 116 (see FIG. 1) can be configured to evaluate the position of the lens at rest in different manners.

In one embodiment, the evaluator module 116 can evaluate whether the lens position is within a predetermined interval. The predetermined interval may provide a threshold value. For example, the predetermined interval may be the interval between "0" and "5," thus the threshold value is "5." In another embodiment, the evaluator module 116 can determine a difference between a predetermined position and the measured position. Furthermore, in another embodiment, the camera can be determined to have the predetermined pointing direction when the lens position is within a predetermined interval, and can be determined to have a pointing direction differing from the predetermined pointing direction when the lens position is outside the predetermined interval. Evaluation of the camera orientation can be determined in many different manners. It is understood that to determine the pointing position of the camera, the evaluator module evaluates the position of the lens when it is not under the influence of the actuator 562 (see FIG. 5).

As discussed above, the camera orientation may be determined by determining whether the lens position lies within a particular interval. For example, FIG. 5 shows the lens at the predetermined position "7" 548, which can be the position of the lens at rest when the camera is pointing in a horizontal direction. An interval between "5" and "7" 552 is also shown. In FIG. 5, if the lens were measured at, for example, position "4" 550, it would be outside the interval 552. As illustrated in FIG. 4, the lens may be in position 4 when the camera is pointing down. The camera can be determined to have a particular pointing direction 534 (see FIG. 5) when the lens is within or outside the predetermined interval 552.

If the position of the lens is "4" 450, from an evaluation, the camera can be determined to have a pointing direction differing from the predetermined horizontal pointing direction because the difference is outside the predetermined interval 552. That is, from the evaluation, the pointing direction may be determined to be substantially downward and not substantially horizontal. The auto-focus function can therefore move the lens to an adjusted starting position that corresponds to focusing on a close object when the pointing direction of the camera is substantially downward as shown in FIG. 4. In this way the auto-focus function may use its image capturing functions starting with an adjusted starting position, such as a position closer to "0," as determined by the camera orientation being evaluated as downward pointing.

As used in this description, the terminology, for example, of downward, horizontal and upward are relative to one another. Positions between down and horizontal, such as a slanted position, are also considered in this discussion. The lens positions shown in the figures are by way of example and of course may be different depending upon the implementation and utilization. As an example, in FIG. 4 which shows the lens cavity 442 pointing down or vertical and the lens 444 is in a resting position "4" 450, were the lens to move above "4," for example to "4.5" or "5," the pointing position can be considered "not down." In the example shown in FIG. 4, the lens may be at rest so that it does not move closer to the position "0" since the lens position is under the influence of gravity and the elastic element 446 when the lens is not under the influence of the actuator 562 (see FIG. 5).

In the event that the camera is pointing above the horizontal level or upward, the lens may be at rest that is, not under the influence of the actuator, closer to the position "10." Therefore the sensor 563 may detect the lens closer to position "10." In such an example, the starting lens position for the auto-focus process, for example, may be closer to position "10" relative to an adjusted starting position when the camera orientation is evaluated as downward pointing.

The evaluation of the difference between the predetermined position and the measured position may also indicate that the electronic device is in motion, particularly if the lens moves with, for example, a predetermined frequency. The above-described assembly may therefore act as a motion sensor. Accordingly, as a motion sensor, the assembly may provide for a variety of functions for the mobile communication device such as a self-testing vibration function. A self-test vibration function instruction module 122 (see FIG. 1) can be configured to receive output from the motion sensor to test a mobile communication device's vibrator that may be used in lieu of a ring-tone generator.

Other motion sensing functions may include the detection of motion caused by shaking of the hand holding the camera. As mentioned, an elastic element coupled to the lens is configured to bias the lens to a predetermined position within the lens cavity when the camera is at a predetermined orientation and is at rest. The lens position sensor 563 measures a plurality of positions of the lens 544 to form a plurality of measured positions of the lens. An evaluator module 116 (see FIG. 1) such as that previously described can be configured to evaluate a difference between the predetermined position and a plurality of measured positions. It can be determined that the camera is in motion when there is a difference between the predetermined position and the measured positions and/or the measured positions are outside a predetermined interval, as previously described. A hand-shaking compensation instruction module 124 (see FIG. 1) receives output from the sensor module 114 and/or the evaluator module 116, or any suitable motion compensation module, to digitally filter images of the camera to compensate for jitter.

Figure 6:
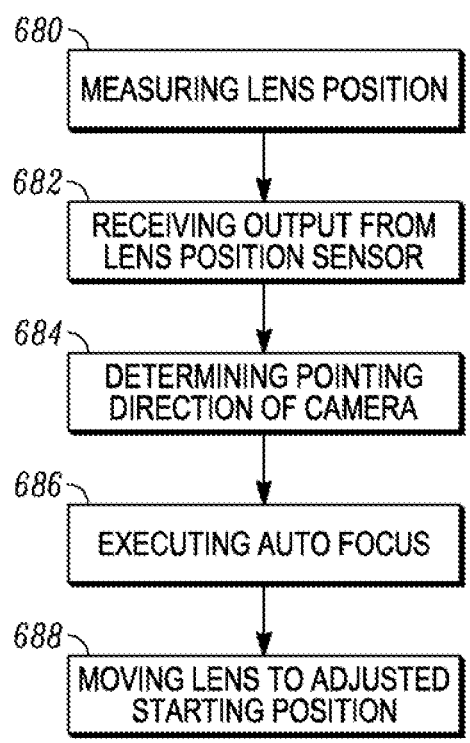
FIG. 6 is a flow chart of an embodiment of a method for an electronic device including a camera having a lens position sensor for determining orientation of the camera.

FIG. 6 is a flow chart of an embodiment of a method for an electronic device including a camera having a lens position sensor for determining orientation of the camera. The described method can be carried out by instruction modules coupled to certain hardware in any suitable manner. As described above, the method includes measuring a position of a lens at rest within the lens cavity 680. The measuring module 112 (see FIG. 1) measures a position of a lens of the camera. The method further includes receiving output from the lens sensor 682 generated by the sensor module 114. The evaluator module 116 evaluates the measured position to determine a pointing direction of the camera based on the position of the lens 684. An auto-focus module 118 executes the auto-focus function with the lens at the starting position or the adjusted starting position 686. The lens moving module 120 activates the actuator 562 (see FIG. 5) to move the lens to an adjusted starting position for an auto-focus function according to the pointing direction. By moving the lens to a new or adjusted starting position 688 for an auto-focus function according to the camera pointing direction, a faster auto-focus method may be possible.

In accordance with the above discussion, a new or improved feature in a camera device may be to improve the speed of an auto-focus function by determining the camera orientation. The auto-focus of the camera may be started at a new starting position instead of starting the auto-focus at a default starting position. By starting the auto-focus closer to the position where the image would most likely have clarity, the auto-focus function may be faster. In such an application, adding an accelerometer capable of determining motion with respect to gravity would be an option to determine camera orientation. However, it would be beneficial if a more cost efficient method and device such as that described above were used to make the improvement to the auto-focus speed.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is understood that the use of relational terms, if any, such as first and second, up and down, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, discussion of such software and ICs, if any, is limited to the essentials with respect to the principles and concepts within the preferred embodiments.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitable entitled.

The invention claimed is:

1. An electronic device with a camera having a lens cavity, the electronic device comprising:
    a lens within the lens cavity;
    an elastic element coupled to the lens and configured to bias the lens to a predetermined position when the camera is oriented in a predetermined pointing direction;
    a lens position sensor to measure a position of the lens within the lens cavity to record a measured lens position; and
    an evaluator configured to determine if the camera is oriented in the predetermined pointing direction based on the position of the lens and to determine a starting position for the lens during an auto-focus process based on the measured lens position.

2. The electronic device of claim 1, wherein the elastic element comprises a spring.

3. The electronic device of claim 1, wherein the lens position sensor comprises at least one of a Hall effect sensor, a capacitive sensor, an inductive sensor, and a photo interrupter.

4. The electronic device of claim 1, wherein the evaluator comprises a processor configured to execute instructions of a software module.

5. The electronic device of claim 1, wherein the predetermined pointing direction is a horizontal orientation.

6. The electronic device of claim 1, wherein the predetermined pointing direction is a downward vertical orientation.

7. The electronic device of claim 1, wherein the camera is determined to have one of a plurality of predetermined pointing directions when a difference between the predetermined position and the measured lens position is within a predetermined interval corresponding to one of the plurality of predetermined pointing directions.

8. The electronic device of claim 1, further comprising:
    a vibrator; and
    a self-test instruction module configured to receive output from the evaluator to test the vibrator.

9. The electronic device of claim 1, further comprising:
    a hand-shaking compensation instruction module configured to receive output from the evaluator to digitally filter images of the camera to compensate for motion due to hand shaking.

* * * * *